United States Patent
Bai et al.

(10) Patent No.: US 12,031,580 B2
(45) Date of Patent: Jul. 9, 2024

(54) DEEP GROOVE BALL BEARING

(71) Applicant: C&U COMPANY LIMITED., Wenzhou (CN)

(72) Inventors: Xuefeng Bai, Wenzhou (CN); Jialiang Xu, Wenzhou (CN)

(73) Assignee: C&U COMPANY LIMITED., Wenzhou (CN)

( * ) Notice: Subject to any disclaimer, the term of this patent is extended or adjusted under 35 U.S.C. 154(b) by 0 days.

(21) Appl. No.: 18/284,309

(22) PCT Filed: Sep. 16, 2021

(86) PCT No.: PCT/CN2021/118717
§ 371 (c)(1),
(2) Date: Sep. 27, 2023

(87) PCT Pub. No.: WO2023/272952
PCT Pub. Date: Jan. 5, 2023

(65) Prior Publication Data
US 2024/0084852 A1    Mar. 14, 2024

(30) Foreign Application Priority Data
Jun. 30, 2021    (CN) .......................... 202110734599.1

(51) Int. Cl.
*F16C 33/38*    (2006.01)
*F16C 33/58*    (2006.01)
(52) U.S. Cl.
CPC ...... *F16C 33/3812* (2013.01); *F16C 33/3881* (2013.01); *F16C 33/583* (2013.01); *F16C 2226/70* (2013.01)

(58) Field of Classification Search
CPC .............. F16C 33/3812; F16C 33/3881; F16C 33/4664; F16C 33/50; F16C 33/502;
(Continued)

(56) References Cited

U.S. PATENT DOCUMENTS 1,241,669 A    10/1917   Schneider
2,017,772 A  * 10/1935   Schildgen ........... F16C 33/3831
                                                      29/898.15
(Continued)

FOREIGN PATENT DOCUMENTS

CN    103608599 A    2/2014
CN    204553567 U    8/2015
(Continued)

*Primary Examiner* — Alan B Waits
(74) *Attorney, Agent, or Firm* — Bayramoglu Law Offices LLC

(57) ABSTRACT

A deep groove ball bearing includes an outer ring, an inner ring, a retainer and steel balls, where the retainer is disposed between the outer ring and the inner ring, sockets are disposed on the retainer, the steel balls are disposed in the sockets, the retainer is formed by two retainer bodies which are separated from each other, grooves are formed in the retainer bodies at intervals, the grooves in one retainer body are combined with the grooves in the other retainer body to form the sockets, each retainer body is provided with a plurality of sub-connectors which are separated from each other, a first connecting block and a second connecting block are formed at two ends of each sub-connector respectively, two grooves are formed in each sub-connector, and a positioning table is disposed between the two grooves in each sub-connector.

3 Claims, 7 Drawing Sheets

(58) Field of Classification Search
CPC ................ F16C 33/583; F16C 33/7843; F16C 33/7856; F16C 2226/70; F16C 2226/74
See application file for complete search history.

(56) References Cited

U.S. PATENT DOCUMENTS

| | | | | |
|---|---|---|---|---|
| 3,054,648 | A * | 9/1962 | Bauer ................. | F16C 33/4611 |
| | | | | 384/577 |
| 9,982,716 | B2 * | 5/2018 | Tsuji ................... | F16C 33/3887 |
| 10,247,241 | B2 * | 4/2019 | Taniguchi ............... | F16C 19/06 |
| 2014/0050432 | A1 | 2/2014 | Hofmann et al. | |
| 2014/0112608 | A1 * | 4/2014 | Ito ......................... | F16C 33/303 |
| | | | | 384/527 |
| 2014/0376850 | A1 * | 12/2014 | Lee ..................... | F16C 33/4641 |
| | | | | 384/577 |
| 2017/0292567 | A1 * | 10/2017 | Taniguchi ........... | F16C 33/3875 |
| 2018/0010641 | A1 | 1/2018 | Chougule | |
| 2019/0024716 | A1 | 1/2019 | Houdayer et al. | |
| 2021/0140478 | A1 * | 5/2021 | Allison .................. | F16C 33/56 |

FOREIGN PATENT DOCUMENTS

| | | |
|---|---|---|
| CN | 206874663 U | 1/2018 |
| CN | 209469714 U | 10/2019 |
| CN | 111201382 A | 5/2020 |
| DE | 102011088642 A1 | 6/2013 |
| IT | 1169663 B | 6/1987 |
| JP | 2007198583 A | 8/2007 |

\* cited by examiner

DEEP GROOVE BALL BEARING

CROSS REFERENCE TO THE RELATED APPLICATIONS

This application is the national phase entry of International Application No. PCT/CN2021/118717, filed on Sep. 16, 2021, which is based upon and claims priority to Chinese Patent Application No. 202110734599.1, filed on Jun. 30, 2021, the entire contents of which are incorporated herein by reference.

TECHNICAL FIELD

The invention relates to the technical field of bearings, in particular to a deep groove ball bearing.

BACKGROUND

The drive motor of new energy vehicles is gradually replacing the engine of traditional fuel vehicles and becoming the key part of the new energy vehicles. Different from conventional motors, the drive motor for new energy vehicles often should be high in instantaneous power and over-load capacity, wide in speed range, and adaptable to frequent starting, stopping, acceleration and deceleration, and should have a high torque when vehicles at a low speed and have a low torque when the vehicles travel at a high speed. All these characteristics of the drive motor determine that the performance of bearings for the drive motor should be better than that of common bearings, and specifically, bearings for the drive motor should be high in speed, capable of changing the speed in an emergency, low in torque and noise, small in temperature rise, long in service life, and the like. In order to meet the requirement for rapid acceleration of new energy vehicles, deep groove ball bearings with a high rotation speed are generally disposed in the drive motor. A retainer is disposed in the deep groove ball bearing and is assembled between an inner ring and an outer ring, and the retainer is typically provided with a circular main structure and ball sockets which are regularly distributed along the circumference of the main structure. The ball socket is generally adopts a concave spherical surface, which is similar to a rolling body of the ball bearing and has a curvature radius slightly greater than that of the ball bearing, and openings are formed in an inner surface and an outer surface of the main structure of the retainer respectively. However, during use, the retainer is likely to melt and crack due to a large temperature rise during rapid acceleration or deceleration, and is prone to impact fractures at positions corresponding to the ball sockets or at other positions, reducing the overall use effect of the retainer; moreover, existing retainers are inconvenient to assemble and produce, which is not beneficial to the improvement of the production and machining efficiency.

SUMMARY

The objective of the invention is to overcome the defects in the prior art by providing a deep groove ball bearing, which is simple in structure, easy to mount, higher in stability, better in in use effect, and higher in production and machining efficiency.

To fulfill the above objective, the invention provides a deep groove ball bearing, which comprises an outer ring, an inner ring, a retainer and steel balls, wherein the retainer is disposed between the outer ring and the inner ring, sockets are disposed on the retainer, the steel balls are disposed in the sockets, the retainer is formed by two retainer bodies which are separated from each other, grooves are formed in the retainer bodies at intervals, the grooves in one retainer body are combined with the grooves in the other retainer body to form the sockets, each retainer body is provided with a plurality of sub-connectors which are separated from each other, a first connecting block and a second connecting block are formed at two ends of each sub-connector respectively, two grooves are formed in each sub-connector, a positioning table is disposed between the two grooves in each sub-connector, the first connecting block on each sub-connector is inserted into and matched with the second connecting block in the adjacent sub-connector to form a connecting board, a connecting arm is disposed on the positioning table, a connecting hole is formed in the connecting board, and the connecting arm is inserted into the connecting hole to fixedly connect to the two retainer bodies.

Such an arrangement has the following beneficial effects: by adopting this structure, the retainer can be divided into the retainer bodies, such that the steel balls can be mounted easily, the two retainer bodies can be connected easily and efficiently through the connecting arms, and the structure is simple; each retainer body is provided with a plurality of sub-connectors which are separated from each other, and each sub-connector comprises two grooves, such that the structure is uniform, and mass production can be realized; moreover, the adjacent sub-connectors are connected through the connecting blocks, the connecting arms are disposed on the positioning tables, and the connecting arms are inserted into and matched with the connecting boards at corresponding positions to connect the retainer bodies, such that the connection correspondence is good, the overall stability of the retainer is high, the retainer bodies are unlikely to be separated from each other and can be changed easily after being damaged, assembly and production are easy, and the use effect of the whole structure is improved.

Further, the connecting arm comprises two elastic grippers, each gripper has an end connected to the corresponding positioning table as well as an end provided with a hook, and a contact surface between the hook and the corresponding connecting hole is sloping.

Such an arrangement has the following beneficial effects: the connecting arm is simple in structure and has a good connecting effect; contact surface between the hook and the corresponding connecting hole is sloping, such that a good guide effect can be realized in the insertion process, and the clamping effect is improved; moreover, the structure is simple and easy to realize.

Further, a first insertion protrusion is formed on the first connecting block, a second insertion protrusion is formed on the second connecting block, the first insertion protrusion is staggered with the second insertion protrusion, a first insertion slot is formed in a position, corresponding to the second insertion protrusion, of the first connecting block, a second insertion slot is formed in a position, corresponding to the first insertion protrusion, of the second connecting block, and the second insertion protrusion is inserted into and matched with the first insertion slot.

Such an arrangement has the following beneficial effects: the first connecting block and the second connecting block can be connected more tightly, installation is fast, the use effect and stability of the whole structure are effectively improved, and the production and machining efficiency is improved.

Further, connecting holes are formed in the first connecting block and the second connecting block respectively and penetrate through the first insertion slot or the second insertion slot, and holes allowing the elastic grippers to penetrate through are formed in the first insertion protrusion and the second insertion protrusion.

Such an arrangement has the following beneficial effects: the stability of the whole structure is further improved, after the first connecting blocks and the second connecting blocks are connected, that is, the retainer bodies are assembled, the elastic grippers can penetrate through the insertion protrusions when the connecting arms are inserted to connect the two retainer bodies, such that the retainer bodies can be connected more tightly and are unlikely to be separated from each other, the use stability of the whole structure is improved, and the use effect is improved.

Further, abutting steps are formed between the first connecting block and the sub-connector, as well as between the second connecting block and the sub-connector respectively, and the positioning table is formed with an abutting stage and is clamped with the abutting steps through the abutting stage.

Such an arrangement has the following beneficial effects: the abutting steps abut against the positioning table, such that when the retainer is used, the stability of the whole structure can be improved, the situation where the whole structure becomes loose due to collisions of the steel balls is avoided, the use effect of the whole structure is improved, the structure is simple and easy to realize, the service life is effectively prolonged, and mounting and positioning are efficient, and the production and machining efficiency is improved.

Further, a first connecting step is formed on an inner wall of the outer ring, a second connecting step is formed on an outer wall of the inner ring, and a dust cover is clamped between the first connecting step and the second connecting step.

Such an arrangement has the following beneficial effects: the steel balls can be covered, the use effect of the whole structure is improved, the structure is simple and easy to realize, leaking of lubricating oil is effectively avoided, and the overall lubricating effect is improved.

DETAILED DESCRIPTION OF THE EMBODIMENTS

Figure 1:
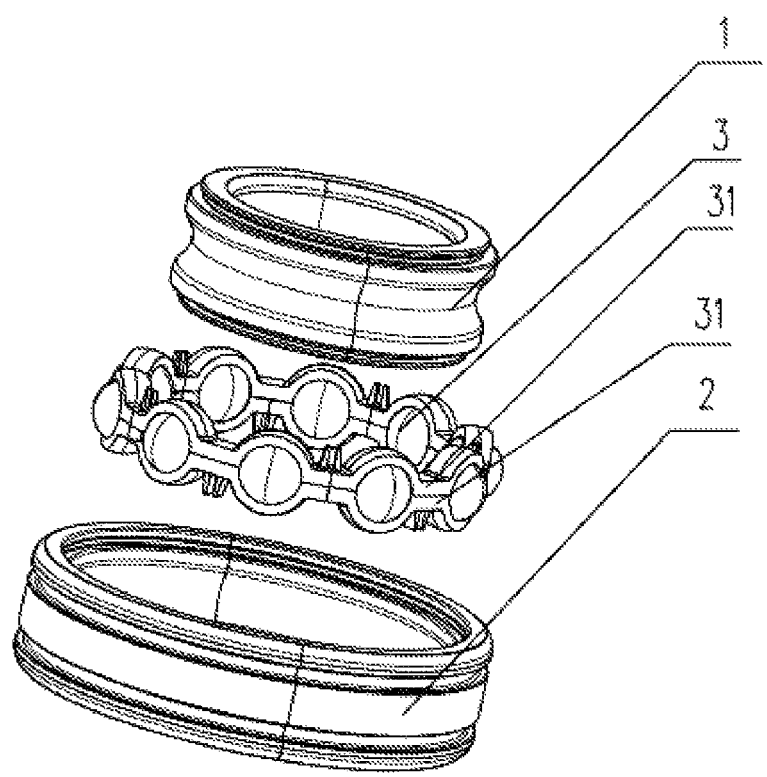
FIG. 1 is an exploded structural view of a first embodiment and a third embodiment of the invention.
Figure 3:
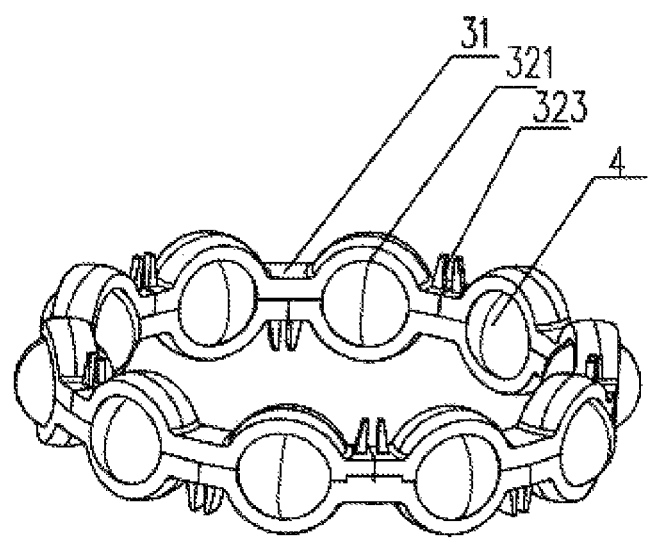
FIG. 3 is a structural view of a retainer in the first embodiment and the second embodiment of the invention.
Figure 4:
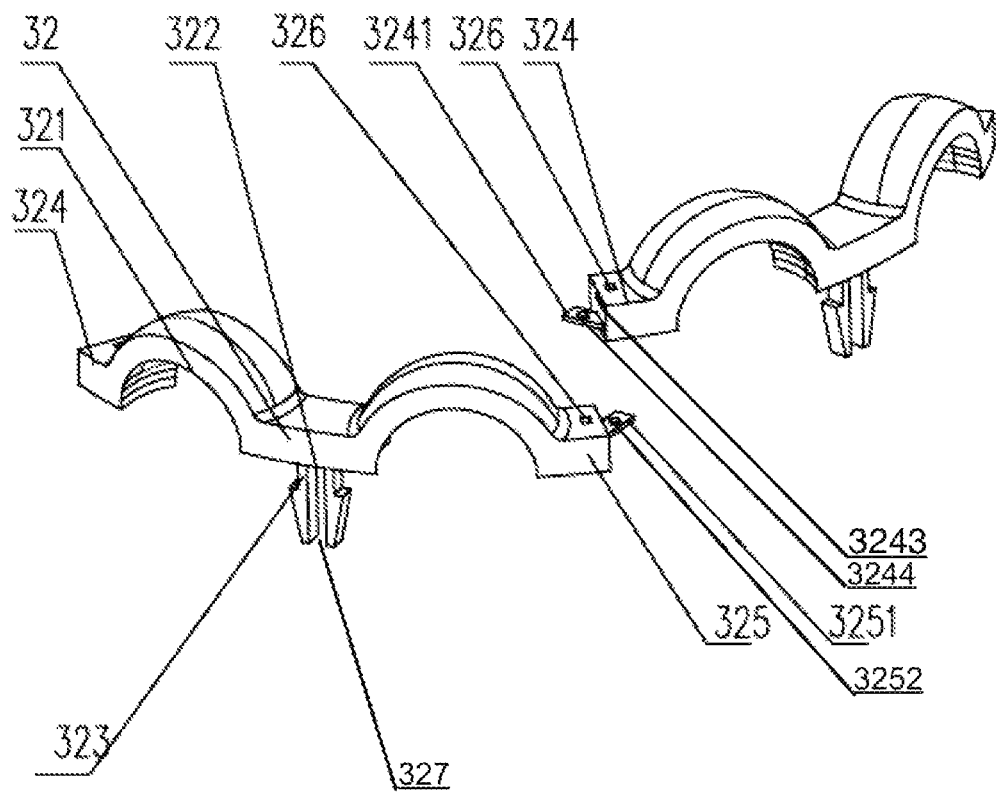
FIG. 4 is a schematic diagram of a connecting structure of two retainer bodies in the first embodiment and the second embodiment of the invention.

As shown in FIG. 1, FIG. 3 and FIG. 4 which illustrate a first embodiment of a deep groove ball bearing of the invention, the deep groove ball bearing comprises an outer ring 2, an inner ring 1, a retainer 3 and steel balls 4, wherein the retainer 3 is disposed between the outer ring 2 and the inner ring 1, sockets are disposed on the retainer 3, the steel balls 4 are disposed in the sockets, the retainer 3 is formed by two retainer bodies 31 which are separated from each other, grooves 321 are formed in the retainer bodies 31 at intervals, the grooves 321 in one retainer body 31 are combined with the grooves 321 in the other retainer body 31 to form the sockets, each of the retainer bodies 31 is provided with a plurality of sub-connectors 32 which are separated from each other, a first connecting block 324 and a second connecting block 325 are formed at two ends of each sub-connector 32 respectively, two grooves 321 are formed in each sub-connector 32, a positioning table 322 is disposed between the two grooves 321 in each sub-connector 32, the first connecting block 324 on each sub-connector 32 is inserted into and matched with the second connecting block 325 on the adjacent sub-connector 32 to form a connecting board, a connecting arm 327 is disposed on the positioning table 322, a connecting hole 326 is formed in the connecting board, and the connecting arms 327 are inserted into the connecting holes 326 to fixedly connect the two retainer bodies 31. Such an arrangement has the following beneficial effects: by adopting this structure, the retainer 3 can be divided into the retainer bodies 31, such that the steel balls can be mounted easily, the two retainer bodies 31 can be connected easily and efficiently through the connecting arms, and the structure is simple; each retainer body 31 is provided with a plurality of sub-connectors 32 which are separated from each other, and each sub-connector 32 comprises two grooves 321, such that the structure is uniform, and mass production can be realized; moreover, the adjacent sub-connectors 32 are connected through the connecting blocks, the connecting arms 327 are disposed on the positioning tables 322, and the connecting arms are inserted into and matched with the connecting boards at corresponding positions to connect the retainer bodies, such that the connection correspondence is good, the overall stability of the retainer 3 is high, the retainer bodies 32 are unlikely to be separated from each other and can be changed easily after being damaged, assembly and production are easy, and the use effect of the whole structure is improved.

Further, the connecting arm comprises two elastic grippers 323, one end of each gripper is connected to the corresponding positioning table 322, the other end of each gripper is provided with a hook, and a contact surface between the hook and the corresponding connecting hole 326 is sloping. Such an arrangement has the following beneficial effects: the connecting arm is simple in structure and has a good connecting effect; contact surface between the hook and the corresponding connecting hole 326 is sloping, such that a good guide effect can be realized in the insertion process, and the clamping effect is improved; moreover, the structure is simple and easy to realize.

Further, a first insertion protrusion 3241 is formed on the first connecting block 324, a second insertion protrusion 3251 is formed on the second connecting block 325, the first insertion protrusion 3241 is staggered with the second insertion protrusion 3251, a first insertion slot is formed in a position, corresponding to the second insertion protrusion 3251, of the first connecting block 324, a second insertion slot is formed in a position, corresponding to the first insertion protrusion 3241, of the second connecting block 325, and the second insertion protrusion 3251 is inserted into and matched with the first insertion slot. Such an arrangement has the following beneficial effects: the first connecting block 324 and the second connecting block 325 can be connected more tightly, installation is fast, the use effect and stability of the whole structure are effectively improved, and the production and machining efficiency is improved.

Further, connecting holes 326 are formed in the first connecting block 324 and the second connecting block 325 respectively and penetrate through the first insertion slot or the second insertion slot, and holes allowing the elastic grippers 323 to penetrate through are formed in the first insertion protrusion 3241 and the second insertion protrusion 3251. Such an arrangement has the following beneficial effects: the stability of the whole structure is further improved, after the first connecting blocks 324 and the second connecting blocks 325 are connected, that is, the retainer bodies 31 are assembled, the elastic grippers 323 can penetrate through the insertion protrusions when the connecting arms are inserted to connect the two retainer bodies 31, such that the retainer bodies 31 can be connected more tightly and are unlikely to be separated from each other, the use stability of the whole structure is improved, and the use effect is improved.

Figure 2:
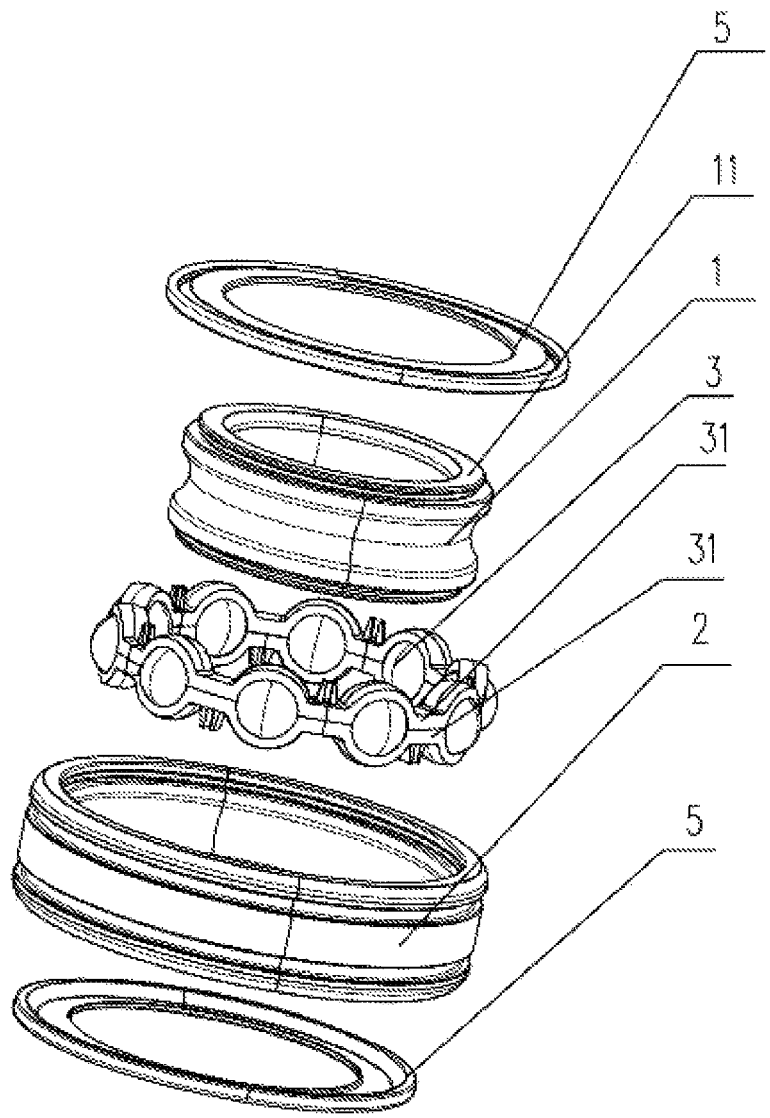
FIG. 2 is an exploded structural view of a second embodiment and a fourth embodiment of the invention.

As shown in FIG. 2-FIG. 4 which illustrate a second embodiment of the deep groove ball bearing of the invention: the deep groove ball bearing comprises an outer ring 2, an inner ring 1, a retainer 3 and steel balls 4, wherein the retainer 3 is disposed between the outer ring 2 and the inner ring 1, sockets are disposed on the retainer 3, the steel balls 4 are disposed in the sockets, the retainer 3 is formed by two retainer bodies 31 which are separated from each other, grooves 321 are formed in the retainer bodies 31 at intervals, the grooves 321 in one retainer body 31 are combined with the grooves 321 in the other retainer body 31 to form the sockets, each of the retainer bodies 31 is provided with a plurality of sub-connectors 32 which are separated from each other, a first connecting block 324 and a second connecting block 325 are formed at two ends of each sub-connector 32 respectively, two grooves 321 are formed in each sub-connector 32, a positioning table 322 is disposed between the two grooves 321 in each sub-connector 32, the first connecting block 324 in each sub-connector 32 is inserted into and matched with the second connecting block 325 on the adjacent sub-connector 32 to form a connecting board, a connecting arm is disposed on the positioning table 322, a connecting hole 326 is formed in the connecting board, and the connecting arms are inserted into the connecting holes 326 to fixedly connect the two retainer bodies 31. Such an arrangement has the following beneficial effects: by adopting this structure, the retainer 3 can be divided into the retainer bodies 31, such that the steel balls can be mounted easily, the two retainer bodies 31 can be connected easily and efficiently through the connecting arms, and the structure is simple; each retainer body 31 is provided with a plurality of sub-connectors 32 which are separated from each other, and each sub-connector 32 comprises two grooves 321, such that the structure is uniform, and mass production can be realized; moreover, the adjacent sub-connectors 32 are connected through the connecting blocks, the connecting arms are disposed on the positioning tables 322, and the connecting arms are inserted into and matched with the connecting boards at corresponding positions to connect the retainer bodies, such that the connection correspondence is good, the overall stability of the retainer 3 is high, the retainer bodies 32 are unlikely to be separated from each other and can be changed easily after being damaged, assembly and production are easy, and the use effect of the whole structure is improved.

Further, the connecting arm comprises two elastic grippers 323, one end of each gripper is connected to the corresponding positioning table 322, the other end of each gripper is provided with a hook, and a contact surface between the hook and the corresponding connecting hole 326 is sloping. Such an arrangement has the following beneficial effects: the connecting arm is simple in structure and has a good connecting effect; contact surface between the hook and the corresponding connecting hole 326 is sloping, such that a good guide effect can be realized in the insertion process, and the clamping effect is improved; moreover, the structure is simple and easy to realize.

Further, a first insertion protrusion 3241 is formed on the first connecting block 324, a second insertion protrusion 3251 is formed on the second connecting block 325, the first insertion protrusion 3241 is staggered with the second insertion protrusion 3251, a first insertion slot is formed in a position, corresponding to the second insertion protrusion 3251, of the first connecting block 324, a second insertion slot is formed in a position, corresponding to the first insertion protrusion 3241, of the second connecting block 325, and the second insertion protrusion 3251 is inserted into and matched with the first insertion slot. Such an arrangement has the following beneficial effects: the first connecting block 324 and the second connecting block 325 can be connected more tightly, installation is fast, the use effect and stability of the whole structure are effectively improved, and the production and machining efficiency is improved.

Further, connecting holes 326 are formed in the first connecting block 324 and the second connecting block 325 respectively and penetrate through the first insertion slot or the second insertion slot, and holes allowing the elastic grippers 323 to penetrate through are formed in the first insertion protrusion 3241 and the second insertion protrusion 3251. Such an arrangement has the following beneficial effects: the stability of the whole structure is further improved, after the first connecting blocks 324 and the second connecting blocks 325 are connected, that is, the retainer bodies 31 are assembled, the elastic grippers 323 can penetrate through the insertion protrusions when the connecting arms are inserted to connect the two retainer bodies 31, such that the retainer bodies 31 can be connected more tightly and are unlikely to be separated from each other, the use stability of the whole structure is improved, and the use effect is improved.

Further, a first connecting step is formed on an inner wall of the outer ring 2, a second connecting step 11 is formed on an outer wall of the inner ring 1, and a dust cover 5 is clamped between the first connecting step and the second connecting step 11. Such an arrangement has the following beneficial effects: the steel balls can be covered, the use effect of the whole structure is improved, the structure is simple and easy to realize, leaking of lubricating oil is effectively avoided, and the overall lubricating effect is improved.

Figure 5:
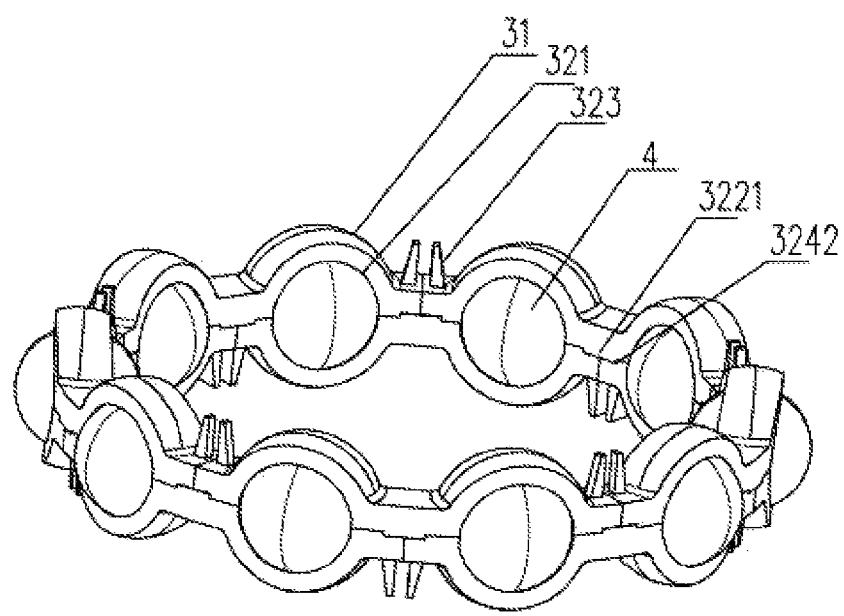
FIG. 5 is a structural view of a retainer in the third embodiment, the fourth embodiment and a fifth embodiment of the invention.
Figure 6:
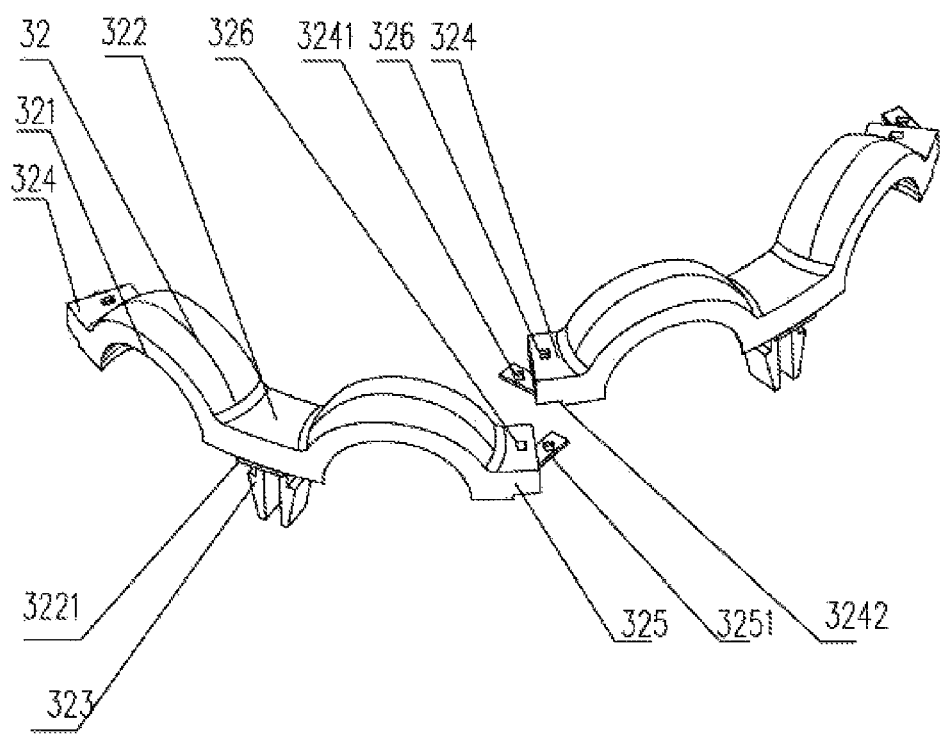
FIG. 6 is a schematic diagram of a connecting structure between two retainer bodies in the third embodiment, the fourth embodiment and the fifth embodiment of the invention.

As shown in FIG. 1, FIG. 5 and FIG. 6 which illustrate a third embodiment of the deep groove ball bearing of the invention: the deep groove ball bearing comprises an outer ring 2, an inner ring 1, a retainer 3 and steel balls 4, wherein the retainer 3 is disposed between the outer ring 2 and the inner ring 1, sockets are disposed on the retainer 3, the steel balls 4 are disposed in the sockets, the retainer 3 is formed by two retainer bodies 31 which are separated from each other, grooves 321 are formed in the retainer bodies 31 at intervals, the grooves 321 in one retainer body 31 are combined with the grooves 321 in the other retainer body 31 to form the sockets, each of the retainer bodies 31 is provided with a plurality of sub-connectors 32 which are separated from each other, a first connecting block 324 and a second connecting block 325 are formed at two ends of each sub-connector 32, two grooves 321 are formed in each sub-connector 32, a positioning table 322 is disposed between the two grooves 321 in each sub-connector 32, the first connecting block 324 on each sub-connector 32 is inserted into and matched with the second connecting block 325 on the adjacent sub-connector 32 to form a connecting board, a connecting arm is disposed on the positioning table 322, a connecting hole 326 is formed in the connecting board, and the connecting arms are inserted into the connecting holes 326 to fixedly connect the two retainer bodies 31. Such an arrangement has the following beneficial effects: by adopting this structure, the retainer 3 can be divided into the retainer bodies 31, such that the steel balls can be mounted easily, the two retainer bodies 31 can be connected easily and efficiently through the connecting arms, and the structure is simple; each retainer body 31 is provided with a plurality of sub-connectors 32 which are separated from each other, and each sub-connector 32 comprises two grooves 321, such that the structure is uniform, and mass production can be realized; moreover, the adjacent sub-connectors 32 are connected through the connecting blocks, the connecting arms are disposed on the positioning tables 322, and the connecting arms are inserted into and matched with the connecting boards at corresponding positions to connect the retainer bodies, such that the connection correspondence is good, the overall stability of the retainer 3 is high, the retainer bodies 32 are unlikely to be separated from each other and can be changed easily after being damaged, assembly and production are easy, and the use effect of the whole structure is improved.

Further, the connecting arm comprises two elastic grippers 323, one end of each gripper is connected to the corresponding positioning table 322, the other end of each gripper is provided with a hook, and a contact surface between the hook and the corresponding connecting hole 326 is sloping. Such an arrangement has the following beneficial effects: the connecting arm is simple in structure and has a good connecting effect; contact surface between the hook and the corresponding connecting hole 326 is sloping, such that a good guide effect can be realized in the insertion process, and the clamping effect is improved; moreover, the structure is simple and easy to realize.

Further, a first insertion protrusion 3241 is formed on the first connecting block 324, a second insertion protrusion 3251 is formed on the second connecting block 325, the first insertion protrusion 3241 is staggered with the second insertion protrusion 3251, a first insertion slot is formed in a position, corresponding to the second insertion protrusion 3251, of the first connecting block 324, a second insertion slot is formed in a position, corresponding to the first insertion protrusion 3241, of the second connecting block 325, and the second insertion protrusion 3251 is inserted into and matched with the first insertion slot. Such an arrangement has the following beneficial effects: the first connecting block 324 and the second connecting block 325 can be connected more tightly, installation is fast, the use effect and stability of the whole structure are effectively improved, and the production and machining efficiency is improved.

Further, connecting holes 326 are formed in the first connecting block 324 and the second connecting block 325 respectively and penetrate through the first insertion slot or the second insertion slot, and holes allowing the elastic grippers 323 to penetrate through are formed in the first insertion protrusion 3241 and the second insertion protrusion 3251. Such an arrangement has the following beneficial effects: the stability of the whole structure is further improved, after the first connecting blocks 324 and the second connecting blocks 325 are connected, that is, the retainer bodies 31 are assembled, the elastic grippers 323 can penetrate through the insertion protrusions when the connecting arms are inserted to connect the two retainer bodies 31, such that the retainer bodies 31 can be connected more tightly and are unlikely to be separated from each other, the use stability of the whole structure is improved, and the use effect is improved.

Further, abutting steps 3242 are formed between the first connecting block 324 and the sub-connector 32, as well as between the second connecting block 325 and the sub-connector 32 respectively, and the positioning table 322 is formed with an abutting stage 3221 and is clamped with the abutting steps 3242 through the abutting stage 3221. Such an arrangement has the following beneficial effects: the abutting steps abut against the positioning table 322, such that when the retainer 3 is used, the stability of the whole structure can be improved, the situation where the whole structure becomes loose due to collisions of the steel balls 4 is avoided, the use effect of the whole structure is improved, the structure is simple and easy to realize, the service life is effectively prolonged, and mounting and positioning are efficient, and the production and machining efficiency is improved.

As shown in FIG. 2, FIG. 5 and FIG. 6 which illustrate a fourth embodiment of the deep groove ball bearing of the invention: the deep groove ball bearing comprises an outer ring 2, an inner ring 1, a retainer 3 and steel balls 4, wherein the retainer 3 is disposed between the outer ring 2 and the inner ring 1, sockets are disposed on the retainer 3, the steel balls 4 are disposed in the sockets, the retainer 3 is formed by two retainer bodies 31 which are separated from each other, grooves 321 are formed in the retainer bodies 31 at intervals, the grooves 321 in one retainer body 31 are combined with the grooves 321 in the other retainer body 31 to form the sockets, each of the retainer bodies 31 is provided with a plurality of sub-connectors 32 which are separated from each other, a first connecting block 324 and a second connecting block 325 are formed at two ends of each sub-connector 32, two grooves 321 are formed in each sub-connector 32, a positioning table 322 is disposed between the two grooves 321 in each sub-connector 32, the first connecting block 324 on each sub-connector 32 is inserted into and matched with the second connecting block 325 on the adjacent sub-connector 32 to form a connecting board, a connecting arm is disposed on the positioning table 322, a connecting hole 326 is formed in the connecting board, and the connecting arms are inserted into the connecting holes 326 to fixedly connect the two retainer bodies 31. Such an arrangement has the following beneficial effects: by adopting this structure, the retainer 3 can be divided into the retainer bodies 31, such that the steel balls can be mounted easily, the two retainer bodies 31 can be connected easily and efficiently through the connecting arms, and the structure is simple; each retainer body 31 is provided with a plurality of sub-connectors 32 which are separated from each other, and each sub-connector 32 comprises two grooves 321, such that the structure is uniform, and mass production can be realized; moreover, the adjacent sub-connectors 32 are connected through the connecting blocks, the connecting arms are disposed on the positioning tables 322, and the connecting arms are inserted into and matched with the connecting boards at corresponding positions to connect the retainer bodies, such that the connection correspondence is good, the overall stability of the retainer 3 is high, the retainer bodies 32 are unlikely to be separated from each other and can be changed easily after being damaged, assembly and production are easy, and the use effect of the whole structure is improved.

Further, the connecting arm comprises two elastic grippers 323, one end of each gripper is connected to the corresponding positioning table 322, the other end of each gripper is provided with a hook, and a contact surface between the hook and the corresponding connecting hole 326 is sloping. Such an arrangement has the following beneficial effects: the connecting arm is simple in structure and has a good connecting effect; contact surface between the hook and the corresponding connecting hole 326 is sloping, such that a good guide effect can be realized in the insertion process, and the clamping effect is improved; moreover, the structure is simple and easy to realize.

Further, a first insertion protrusion 3241 is formed on the first connecting block 324, a second insertion protrusion 3251 is formed on the second connecting block 325, the first insertion protrusion 3241 is staggered with the second insertion protrusion 3251, a first insertion slot is formed in a position, corresponding to the second insertion protrusion 3251, of the first connecting block 324, a second insertion slot is formed in a position, corresponding to the first insertion protrusion 3241, of the second connecting block 325, and the second insertion protrusion 3251 is inserted into and matched with the first insertion slot. Such an arrangement has the following beneficial effects: the first connecting block 324 and the second connecting block 325 can be connected more tightly, installation is fast, the use effect and stability of the whole structure are effectively improved, and the production and machining efficiency is improved.

Further, connecting holes 326 are formed in the first connecting block 324 and the second connecting block 325 respectively and penetrate through the first insertion slot or the second insertion slot, and holes allowing the elastic grippers 323 to penetrate through are formed in the first insertion protrusion 3241 and the second insertion protrusion 3251. Such an arrangement has the following beneficial effects: the stability of the whole structure is further improved, after the first connecting blocks 324 and the second connecting blocks 325 are connected, that is, the retainer bodies 31 are assembled, the elastic grippers 323 can penetrate through the insertion protrusions when the connecting arms are inserted to connect the two retainer bodies 31, such that the retainer bodies 31 can be connected more tightly and are unlikely to be separated from each other, the use stability of the whole structure is improved, and the use effect is improved.

Further, abutting steps 3242 are formed between the first connecting block 324 and the sub-connector 32, as well as between the second connecting block 325 and the sub-connector 32 respectively, and the positioning table 322 is formed with an abutting stage 3221 and is clamped with the abutting steps 3242 through the abutting stage 3221. Such an arrangement has the following beneficial effects: the abutting steps abut against the positioning table 322, such that when the retainer 3 is used, the stability of the whole structure can be improved, the situation where the whole structure becomes loose due to collisions of the steel balls 4 is avoided, the use effect of the whole structure is improved, the structure is simple and easy to realize, the service life is effectively prolonged, and mounting and positioning are efficient, and the production and machining efficiency is improved.

Further, a first connecting step is formed on an inner wall of the outer ring 2, a second connecting step 11 is formed on an outer wall of the inner ring 1, and a dust cover 5 is clamped between the first connecting step and the second connecting step 11. Such an arrangement has the following beneficial effects: the steel balls can be covered, the use effect of the whole structure is improved, the structure is simple and easy to realize, leaking of lubricating oil is effectively avoided, and the overall lubricating effect is improved.

Figure 7:
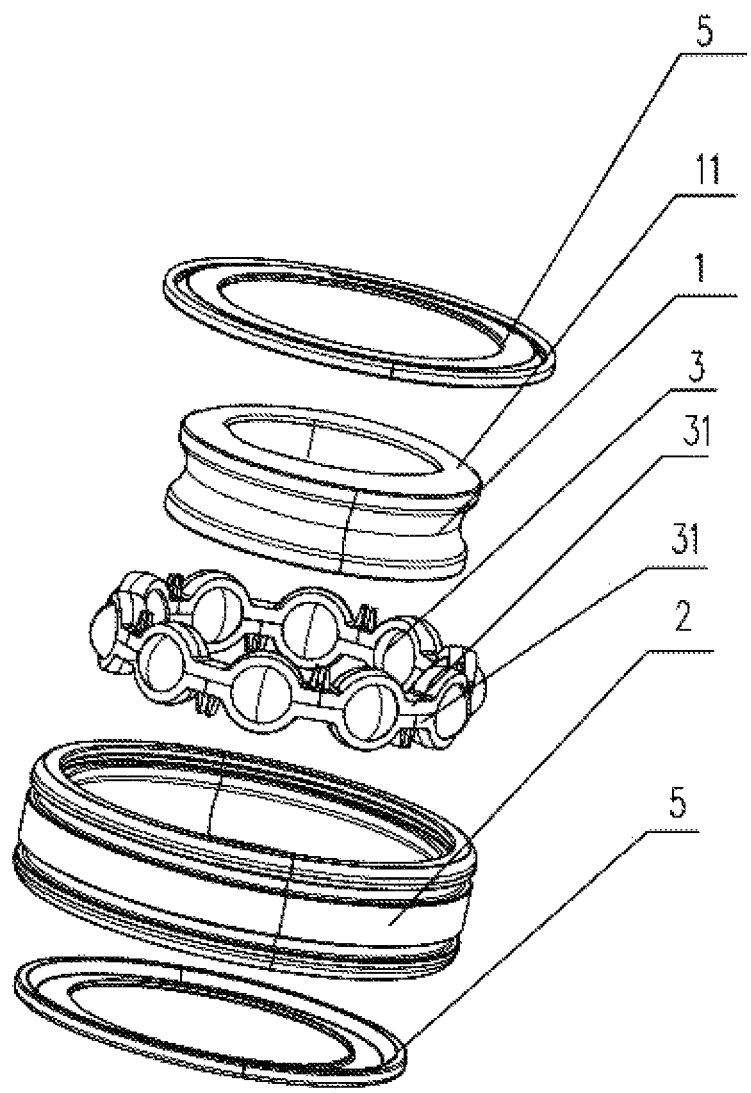
FIG. 7 is an exploded structural view of the fifth embodiment of the invention.

As shown in FIG. 5, FIG. 6 and FIG. 7 which illustrate a fifth embodiment of the deep groove ball bearing of the invention: the deep groove ball bearing comprises an outer ring 2, an inner ring 1, a retainer 3 and steel balls 4, wherein the retainer 3 is disposed between the outer ring 2 and the inner ring 1, sockets are disposed on the retainer 3, the steel balls 4 are disposed in the sockets, the retainer 3 is formed by two retainer bodies 31 which are separated from each other, grooves 321 are formed in the retainer bodies 31 at intervals, the grooves 321 in one retainer body 31 are combined with the grooves 321 in the other retainer body 31 to form the sockets, each of the retainer bodies 31 is provided with a plurality of sub-connectors 32 which are separated from each other, a first connecting block 324 and a second connecting block 325 are formed at two ends of each sub-connector 32, two grooves 321 are formed in each sub-connector 32, a positioning table 322 is disposed between the two grooves 321 in each sub-connector 32, the first connecting block 324 on each sub-connector 32 is inserted into and matched with the second connecting block 325 on the adjacent sub-connector 32 to form a connecting board, a connecting arm is disposed on the positioning table 322, a connecting hole 326 is formed in the connecting board, and the connecting arms are inserted into the connecting holes 326 to fixedly connect the two retainer bodies 31. Such an arrangement has the following beneficial effects: by adopting this structure, the retainer 3 can be divided into the retainer bodies 31, such that the steel balls can be mounted easily, the two retainer bodies 31 can be connected easily and efficiently through the connecting arms, and the structure is simple; each retainer body 31 is provided with a plurality of sub-connectors 32 which are separated from each other, and each sub-connector 32 comprises two grooves 321, such that the structure is uniform, and mass production can be realized; moreover, the adjacent sub-connectors 32 are connected through the connecting blocks, the connecting arms are disposed on the positioning tables 322, and the connecting arms are inserted into and matched with the connecting boards at corresponding positions to connect the retainer bodies, such that the connection correspondence is good, the overall stability of the retainer 3 is high, the retainer bodies 32 are unlikely to be separated from each other and can be changed easily after being damaged, assembly and production are easy, and the use effect of the whole structure is improved.

Further, the connecting arm comprises two elastic grippers 323, one end of each gripper is connected to the corresponding positioning table 322, the other end of each gripper is provided with a hook, and a contact surface between the hook and the corresponding connecting hole 326 is sloping. Such an arrangement has the following beneficial effects: the connecting arm is simple in structure and has a good connecting effect; contact surface between the hook and the corresponding connecting hole 326 is sloping, such that a good guide effect can be realized in the insertion process, and the clamping effect is improved; moreover, the structure is simple and easy to realize.

Further, a first insertion protrusion 3241 is formed on the first connecting block 324, a second insertion protrusion 3251 is formed on the second connecting block 325, the first insertion protrusion 3241 is staggered with the second insertion protrusion 3251, a first insertion slot 3243 is formed in a position, corresponding to the second insertion protrusion 3251, of the first connecting block 324, a second insertion slot is formed in a position, corresponding to the first insertion protrusion 3241, of the second connecting block 325, and the second insertion protrusion 3251 is inserted into and matched with the first insertion slot 3243. Such an arrangement has the following beneficial effects: the first connecting block 324 and the second connecting block 325 can be connected more tightly, installation is fast, the use effect and stability of the whole structure are effectively improved, and the production and machining efficiency is improved.

Further, connecting holes 326 are formed in the first connecting block 324 and the second connecting block 325 respectively and penetrate through the first insertion slot or the second insertion slot, and holes (3252, 3244) allowing the elastic grippers 323 to penetrate through are formed in the first insertion protrusion 3241 and the second insertion protrusion 3251. Such an arrangement has the following beneficial effects: the stability of the whole structure is further improved, after the first connecting blocks 324 and the second connecting blocks 325 are connected, that is, the retainer bodies 31 are assembled, the elastic grippers 323 can penetrate through the insertion protrusions when the connecting arms are inserted to connect the two retainer bodies 31, such that the retainer bodies 31 can be connected more tightly and are unlikely to be separated from each other, the use stability of the whole structure is improved, and the use effect is improved.

Further, abutting steps 3242 are formed between the first connecting block 324 and the sub-connector 32, as well as between the second connecting block 325 and the sub-connector 32 respectively, and the positioning table 322 is formed with an abutting stage 3221 and is clamped with the abutting steps 3242 through the abutting stage 3221. Such an arrangement has the following beneficial effects: the abutting steps abut against the positioning table 322, such that when the retainer 3 is used, the stability of the whole structure can be improved, the situation where the whole structure becomes loose due to collisions of the steel balls 4 is avoided, the use effect of the whole structure is improved, the structure is simple and easy to realize, the service life is effectively prolonged, and mounting and positioning are efficient, and the production and machining efficiency is improved.

Further, a dust cover 5 is clamped between the outer ring 2 and the inner ring 1. Such an arrangement has the following beneficial effects: the steel balls can be covered, the use effect of the whole structure is improved, the structure is simple and easy to realize, leaking of lubricating oil is effectively avoided, and the overall lubricating effect is improved.

The above embodiments are merely preferred and specific ones of the invention, and common modifications and substitutions made by those skilled in the art within the scope of the technical solution of the invention should fall within the protection scope of the invention.

What is claimed is:

1. A deep groove ball bearing, comprising an outer ring, an inner ring, a retainer, and steel balls, wherein the retainer is disposed between the outer ring and the inner ring, sockets are disposed on the retainer, and the steel balls are disposed in the sockets, the retainer is formed by two retainer bodies, wherein the two retainer bodies are separated from each other, a plurality of grooves are formed in each of the two retainer bodies at intervals, the plurality grooves in one retainer body are combined with the plurality grooves in the other retainer body to form the sockets, each retainer body is provided with a plurality of sub-connectors, wherein the plurality of sub-connectors are separated from each other, a first connecting block and a second connecting block are formed at two ends of each sub-connector respectively, adjacent grooves are formed in each sub-connector, a positioning table is disposed between the adjacent grooves in each sub-connector, the first connecting block on each of the sub-connectors is inserted into and matched with the second connecting block in an adjacent sub-connector, a connecting arm is disposed on the positioning table and the connecting arm comprises two elastic grippers, wherein the two elastic grippers each respectively penetrate through a connecting hole formed in the first connecting block and the second connecting block to fixedly connect the two retainer bodies, each gripper has a first end connected to the corresponding positioning table as well as a second end provided with a hook, and a first insertion protrusion is formed on the first connecting block, a second insertion protrusion is formed on the second connecting block, the first insertion protrusion is staggered with the second insertion protrusion, a first insertion slot is formed in a position, corresponding to the second insertion protrusion, on the first connecting block, the second insertion protrusion is inserted into and matched with the first insertion slot, the connecting hole formed in the first connecting block penetrates through the first insertion slot, and holes allowing the elastic grippers to penetrate through are formed in the first insertion protrusion and the second insertion protrusion.

2. The deep groove ball bearing according to claim 1, wherein the positioning table is formed with an abutting stage and is clamped with abutting steps through the abutting stage.

3. The deep groove ball bearing according to claim 1, wherein a first connecting step is formed on an inner wall of the outer ring, a second connecting step is formed on an outer wall of the inner ring, and a dust cover is clamped between the first connecting step and the second connecting step.

* * * * *